(12) United States Patent
Van De Loo (10) Patent No.: US 11,553,697 B2
(45) Date of Patent: Jan. 17, 2023

(54) DEVICE AND METHOD TO REMOVE REJECTED EGGS IN HATCHERIES

(71) Applicant: INNOVATEC BESLOTEN VENNOOTSCHAP, Asperen (NL)

(72) Inventor: Philip Karel Marie-Louise Van De Loo, Vianen (NL)

(73) Assignee: INNOVATEC BESLOTEN VENNOOTSCHAP, Asperen (NL)

( * ) Notice: Subject to any disclaimer, the term of this patent is extended or adjusted under 35 U.S.C. 154(b) by 345 days.

(21) Appl. No.: 16/764,051

(22) PCT Filed: Nov. 13, 2018

(86) PCT No.: PCT/IB2018/058905
§ 371 (c)(1),
(2) Date: May 14, 2020

(87) PCT Pub. No.: WO2019/097397
PCT Pub. Date: May 23, 2019

(65) Prior Publication Data
US 2020/0375152 A1 Dec. 3, 2020

(30) Foreign Application Priority Data
Nov. 14, 2017 (BE) .................................. 2017/5832

(51) Int. Cl.
| | |
|---|---|
| *B25J 15/00* | (2006.01) |
| *A01K 41/00* | (2006.01) |
| *A01K 43/00* | (2006.01) |
| *B25J 15/06* | (2006.01) |

(52) U.S. Cl.
CPC .............. *A01K 41/00* (2013.01); *A01K 43/00* (2013.01); *B25J 15/0052* (2013.01); *B25J 15/0625* (2013.01)

(58) Field of Classification Search
CPC ... B25J 15/0052; B25J 15/0625; A01K 41/00; A01K 43/00
See application file for complete search history.

(56) References Cited

U.S. PATENT DOCUMENTS

| | | | | |
|---|---|---|---|---|
| 5,092,578 | A | * 3/1992 | Bergmeier | B65H 3/48 271/106 |
| 5,234,207 | A | * 8/1993 | Lindstrom | B65H 3/0816 271/106 |
| 6,149,375 | A | 11/2000 | Hebrank | |
| 2017/0210571 | A1 | 7/2017 | Suh | |

FOREIGN PATENT DOCUMENTS

| | | | | |
|---|---|---|---|---|
| KR | 10-1553777 | * | 9/2015 | ............. A01K 43/00 |
| WO | 2015037995 A1 | | 3/2015 | |

OTHER PUBLICATIONS

International Search Report, dated Feb. 21, 2019, from corresponding PCT application No. PCT/IB2018/058905.

* cited by examiner

*Primary Examiner* — Lynn E Schwenning
(74) *Attorney, Agent, or Firm* — Nixon & Vanderhye (57) ABSTRACT

Disclosed is a device for the automatic removal of rejected eggs from an incubation tray, whereby the device includes a suction power above the egg to suck up the egg, and the device further includes a blowing power against the bottom of the egg to blow away the egg, whereby the blowing power blows an air flow or overpressure against the bottom of the egg. Also disclosed is a method for the automatic removal of one or more rejected eggs from an incubation tray.

35 Claims, 4 Drawing Sheets

DEVICE AND METHOD TO REMOVE REJECTED EGGS IN HATCHERIES

BACKGROUND OF THE INVENTION

Field of the Invention

The present invention relates to a method and device to remove rejected eggs in hatcheries.

Description of the Related Art

In poultry hatcheries, eggs are hatched in so-called incubation machines. This can be eggs of all kinds of poultry such as chickens, turkeys, ducks etc.

The hatching periods or days mentioned in the description below are based on the hatching process of chickens. In other poultry these periods or days are often different.

The existing method in hatcheries is as follows.

Usually the fertilised eggs are delivered to a hatchery in a lorry. These eggs are from various producers.

Sometimes eggs are first put in a storage area. This storage is used as a buffer between supply and demand.

Usually the eggs that enter a hatchery are first disinfected to minimise the risk that viruses, bacteria and fungi enter a hatchery in this way.

Usually the eggs are in incubation trays during approximately the first 18 days. Various embodiments of these incubation trays are known in the market.

When the hatching process has to start, the incubation trays are slid into trolleys. These are trolleys with a certain tilting device. Indeed, during the first 14 to 18 days the eggs need to be able to be tilted approximately 45 degrees alternately to the right and left.

A number of trolleys is then wheeled into an incubator. The climate is regulated in this incubator to ensure optimal growth of the embryos. The parameters that are controlled are temperature, atmospheric humidity and the CO2 content.

After approximately 18 days the trolleys are removed from the incubators. This is necessary because there is no room in the incubation trays for the chicks to hatch.

The incubation trays are removed from the trolleys and subsequently the eggs are checked for fertilisation and/or viability in a so-called candling machine.

Over the past years measurement methods have become available to measure, for example, the heart rate of chicks in the egg. This has the advantage that only live embryos are hatched.

The eggs that are not viable are roughly divided into two categories. The first category contains the eggs that let through a lot of light and the second category the eggs that let through little light.

If eggs let through a lot of light it is possible that the egg was not fertilised or the embryo died in the first days. These eggs can be collected separately because these eggs can still be processed in, for example, cosmetics or as a raw material for animal feed.

However, there are also eggs that do not have a heart rate but are dark. These are mostly embryos that died at a later stage. However, some of these eggs are so-called bangers or exploders.

These exploders are formed when bacteria or other microorganisms penetrate the egg. Often this occurs when an egg collided with something in the processing process. This causes small tears in the eggshell such that a bacteria or other microorganism can penetrate it.

An egg can also be infected in other ways. This description assumes that the formation of exploders is a fact.

The climatological circumstances in an incubator are ideal for the growth of bacteria or other microorganisms which subsequently causes the embryo to die. Because the bacteria or other microorganisms are given the chance to multiply for days, whereby, among others, a gas forms, a certain pressure develops in the egg. Sometimes these eggs explode in the incubator, sometimes during the processing, sometimes in the hatcher and sometimes with the processing of the chicks.

Let it be clear that exploders that explode are undesired, both from an economic and a hygienic perspective. The bacteria or other microorganisms released at that moment can infect other eggs or chicks. Not only can the chicks get optically dirty, but the chicks can also get ill and die because of this. It is also possible that these bacteria or other microorganisms end up on parts of the machine, such that eggs or chicks are infected, which come into contact with this machine afterwards. Examples of this include: vacuum egg lifters or conveyor belts for chicks. This also makes cleaning the machine more difficult.

It is therefore very important that possibly infected eggs are removed from the process as soon as possible after it was detected that the egg is unwanted and possibly an exploder.

Systems are known on the market whereby eggs with a viable embryo are the first to be taken out of the incubation tray, such that the rejected eggs remain on the incubation tray. The major disadvantage of this method is that often eggs with a viable embryo remain between the waste.

Often the eggs are removed from an incubation tray with vacuum egg lifters. However, a vacuum egg lifter needs a good vacuum to be able to lift an egg. In practice this goes wrong quite a few times, because, for example, a vacuum egg lifter has a tear due to intensive use or the egg is soiled somehow such that the connection between the egg and the vacuum egg lifter is not vacuum sealed and the egg is therefore not lifted. The vacuum system may also get blocked because dirt or remains of the egg end up in the switching valves.

After the prehatching process the incubation tray is transported on a transport system. The status per egg is only known after the monitoring station. Only now can the (exploder) eggs be removed.

The machine that removes the eggs consists of 2 parts, a vacuum system and a compressed air system. The blowing power and suction power work together to retrieve the egg that needs to be removed from among the other eggs.

However, this system has a major disadvantage. Some (exploder) eggs are difficult to remove. These are usually (exploder) eggs that have leaked a certain substance. It is also possible that a substance has leaked on other eggs. Because of this substance the eggs are stuck in the incubation tray. The removal of these stuck eggs is sometimes not possible in the manner described above.

SUMMARY OF THE INVENTION

The purpose of the present invention is to provide a solution to at least one of the aforementioned and other disadvantages.

In the present invention the stuck egg is still removed from the incubation tray.

The eggs of which it has been determined that there is no heart rate and which let through less light than a particular level, are removed from the process with the device according to the invention. Exploders are removed from the process as soon as possible and with certainty.

Of course it is also possible to remove all kinds of other categories of eggs with the present invention. For example, when the eggs enter a hatchery they can also be checked. Eggs that do not meet certain requirements can be removed from the process. For example, eggs with two yolks, extremely dirty eggs, deformed eggs, eggs with a crack, etc. It is also possible of course to remove the so-called candled eggs with the present invention. However, the description below is based on the removal of exploders because often these are the eggs that are the most difficult to remove.

Determining whether an egg is an exploder or not, is not part of this invention.

To this end, the invention relates to a device for the automatic removal of rejected eggs from an incubation tray whereby the device comprises a suction power above the egg to suck up the egg, whereby the device further comprises a blowing power against the bottom of the egg to blow away the egg, whereby the blowing power blows an air flow or overpressure against the bottom of the egg.

In a preferred embodiment the device further comprises a push system to push loose a rejected egg from below out of the incubation tray.

In another preferred embodiment the device comprises a vacuum system as suction power above the egg to suck up the egg and a compressed air system as blowing power against the bottom of the egg to blow the egg away.

In a specific embodiment the suction power is provided by a suction tube that is connected to a vacuum means, whereby the suction tube extracts the egg or the remains of the egg into the tube.

The blowing power blows the egg into the suction tube.

In a further specific embodiment the blowing power is provided by an air outlet that blows an air flow or overpressure against the bottom of the egg.

Preferably the suction tube and/or the air outlet is vertically movable when positioned respectively above and under the egg.

In a preferred embodiment the air outlet is provided with a push system with a vertical movement to push loose a rejected egg that is stuck from the incubation tray.

In yet another preferred embodiment the suction tube is provided with a vertically movable tube which is moved down such that the egg is partially or completely in the suction tube.

The vertical movement of the suction tube and the vertical movement of the air outlet can be set independently from each other.

The device comprises one suction tube and air outlet, or more individual suction tubes and air outlets lined up behind each other in the transport direction.

Suction tubes/air outlets can be positioned above and under the egg by means of a lateral movement in comparison to the transport movement.

In a certain embodiment the number and the position of the suction tubes above and the number and the position of the air outlets under the eggs may correspond with the number of rows and the position of the eggs in the incubation tray.

The suction tube and the air outlet are separate devices or integrated in one device.

Preferably the suction power is provided at the same time as the blowing power.

Preferably the suction power is provided continuously.

In a preferred embodiment the device comprises a transport system for the transport of the incubation trays.

The transport system moves the incubation tray in two directions, back and forth, or stops it moving.

Preferably the rejected eggs are removed during transport of the incubation tray.

The device is preferably provided with a first station for the removal of rejected eggs, and a post-monitoring second station for monitoring whether the rejected egg has effectively been removed.

Only the rejected eggs are removed from the incubation tray and not the non-rejected eggs.

The rejected egg is pushed up from the bottom of the incubation tray out of the incubation tray via a push system located under the incubation tray. The advantage is that rejected eggs that are stuck to the incubation tray are also effectively removed. To this end the incubation tray is provided with openings on the level of the cup on which the egg rests. Via these openings a push system, located below the incubation tray, can push the egg up.

The good, non-rejected eggs remain on the incubation tray untouched.

Removing an exploder in the described manner has the big advantage that only the stuck exploders are touched and not the good eggs that are also in the same incubation tray. There are no parts in the machine that touch eggs with a viable embryo. In this way biosecurity is kept at a high level.

Furthermore, all rejected eggs are removed, including the ones that are stuck.

Preferably the device comprises a vacuum and compressed air system to remove the rejected eggs from among the other approved eggs.

The device is provided with a suction power above the egg to suck up the egg and a blowing power below the egg to blow the egg away.

In a certain embodiment of a device according to the invention, the suction power is provided by a suction tube with a sealable valve that is connected to a vacuum means and the blowing power is provided by nozzles that blow a certain air flow or overpressure against the bottom of the egg.

In another embodiment of a device according to the invention, the blowing power is provided by nozzles which blow an air flow or overpressure against the bottom of the egg.

In a very preferred embodiment of a device according to the invention, the device is provided with a nozzle with a vertical movement to push loose an egg.

Preferably, the vertical movement of the nozzle is controlled by a pneumatic cylinder.

Preferably, the nozzle has a shape of a shell or cup which supports the shell of the egg.

In another preferred embodiment of a device according to the invention, the suction tube is provided with a vertically movable tube.

In a special embodiment of a device according to the invention, the suction tube sucks up the egg or the remains of the egg in the event of an exploding egg.

In another preferred embodiment of a device according to the invention, the egg is subsequently extracted.

In a certain embodiment of a device according to the invention, the egg concerns an exploder.

In a very specific embodiment of a device according to the invention, the egg is stuck to the incubation tray.

Preferably, the device according to the invention comprises a transport system to transport the incubation trays.

Preferably, the transport system moves the incubation tray at a certain speed in two directions, back and forth, or makes it stop.

Preferably, the opening and/or closing of the valve and the opening and/or closing of the nozzles and/or moving of the suction tube and/or the moving of the pusher of the egg are set independently from each other.

In a preferred embodiment of a device according to the invention, the device is provided with a first station comprising a suction tube above the egg and a nozzle under the egg to remove rejected eggs, and a second station comprising such suction tube and such nozzle to remove stuck rejected eggs, whereby optionally the suction tube and/or the nozzle are vertically movable.

In a specific embodiment of a device according to the invention, the suction tube and the nozzle of the second station are made to be vertically movable.

Preferably, the number and the position of the suction tubes/valves above and the nozzles under the eggs correspond with the number of rows and the position (column) of the eggs in the incubation tray.

In a previous monitoring step the rejected eggs are detected and their position (e.g. a row/column in the incubation tray) is saved. Optionally, this detection of rejected eggs can also be done in real-time. Only the valves/suction tubes/nozzles with the position of the rejected eggs are activated on removal of the eggs concerned in a certain position in the incubation tray.

In a certain embodiment of a device according to the invention, the valves can also be positioned in two rows behind each other above the eggs.

In an alternative embodiment of a device according to the invention, one or more systems (suction tubes (6) and nozzles (8)) as described above can be positioned by means of a lateral movement above and under the egg. The push system can also be made in this way. This means the various embodiments can be executed per row of the incubation tray, but also be placed on a laterally movable unit. Here too, many different embodiments are possible, depending on the desired capacity of the machine line.

In a specific embodiment the device can be provided with extraction, such that any released toxic gases can be extracted.

In another specific embodiment the machine can be provided with a system to disinfect the eggs and/or the machine. For example, this can be done by spraying a certain disinfecting liquid over the eggs or the machine parts.

In another specific embodiment the device can be provided with means to easily clean the device, such as a shortcut in the extraction tube, to clean the insides of the valve and the extraction tube.

The invention also related to a method for the automatic removal of one or more rejected eggs from an incubation tray, comprising one or more suction tubes and one or more air outlets for the removal of an egg, and a transport system for the transport of the incubation tray, the method comprising the following steps: a) positioning the egg(s) under a suction tube and above an air outlet, b) sucking up the egg(s) via the suction tube, c) blowing up the rejected egg(s) from below via the air outlet into the suction tube, and d) extracting the egg(s) or the remains of the egg via the suction tube.

In a preferred embodiment the steps b) and c) are performed at the same time.

In one embodiment the positioning in step a) is performed by laterally moving a suction tube and an air outlet above and under an egg to be removed.

In another embodiment the positioning in step a) is performed by positioning the tray with the egg(s) to be removed under the suction tube(s) or above the air outlet(s).

In a preferred embodiment the steps are repeated until all rejected eggs are removed from the incubation tray.

In yet a preferred embodiment the eggs are removed during transport.

In a specific embodiment multiple eggs are removed at the same time.

In a preferred embodiment the incubation tray on the transport system has a constant speed or is not moving during the removal of the egg.

In a preferred embodiment in step b) the suction tube is moved down such that the egg is partially or completely in the suction tube.

In yet a preferred embodiment in step c) the air outlet or a push system is moved upwards, such that the egg is lifted from the bottom and is pushed further into the suction tube.

Preferably it is determined by means of a monitoring medium whether the rejected egg has effectively been removed.

In a specific embodiment the incubation tray is stopped and the transport direction is reversed if the egg has not been removed.

The invention also relates to a method for the removal of eggs that are stuck, whereby in step b) moving the suction tube down such that the egg is partially or completely in the suction tube, and in step c) moving the air outlet or a push system upwards such that the egg is lifted from the bottom and is pushed further into the suction tube.

The invention also relates to a method for the automatic removal of rejected eggs from an incubation tray, comprising one or more valves/suction tubes and one or more nozzles for the removal of an egg and a transport system for the transport of an incubation tray, which method comprises the following steps: a) positioning the egg under a suction tube and above a nozzle, b) moving the vertically movable tube down such that the egg is partially or completely in the tube, c) at the same time via the nozzle making a vertical movement back to the top, such that the egg is lifted from the bottom and is pushed further into the tube and d) optionally extracting the egg or the remains of the egg via the suction tube.

In a certain embodiment of a method according to the invention, a monitoring medium determines during the transport of the incubation tray determines whether the rejected egg that should have been removed is effectively gone.

In a preferred embodiment of a method according to the invention, the incubation tray is transported back until the egg is located under the suction tube and above the nozzle.

In a certain embodiment of a method according to the invention, the blow system to push up the egg can be switched on or off.

In an alternative embodiment of a method according to the invention, the incubation tray is not moving during the removal of the egg.

In another preferred embodiment of a method according to the invention, the incubation tray is stopped and the transport direction is reversed if the egg has not been removed.

In a specific embodiment of a method according to the invention, this is preceded by a first removal step in a first station, whereby the rejected eggs are removed, the first station comprising one or more valves/suction tubes and one or more nozzles for the removal of an egg, a transport system for the transport of an incubation tray, which method comprises the following steps: a) positioning the egg under a valve/suction tube and above a nozzle, b) opening the valve and sucking up the egg via the suction tube and c) at the same time, blowing up the rejected egg via the nozzle from below.

Preferably the incubation tray on the transport system has a constant speed or is not moving during the removal of the egg.

In a certain embodiment of a method according to the invention, in a monitoring station in an earlier step, an egg is detected as having been rejected and the position of the egg in the incubation tray is saved.

In a certain embodiment of a method according to the invention, the suction tube and the nozzle are not movable in the first station.

The invention also relates to the use of a push system below the egg for the removal of rejected eggs from an incubation tray.

The invention also relates to the use of a push system, as described above, whereby a suction system above the egg extracts (fallen apart) eggs or remains of an egg from an incubation tray and whereby both a fixed and a movable suction tube can be used.

BRIEF DESCRIPTION OF THE DRAWINGS

With the intention of better showing the characteristics of the invention, a preferred embodiment of a device and method according to the invention is described hereinafter, by way of an example without any limiting nature, with reference to the accompanying drawings wherein.

DESCRIPTION OF THE PREFERRED EMBODIMENTS

Figure 1:
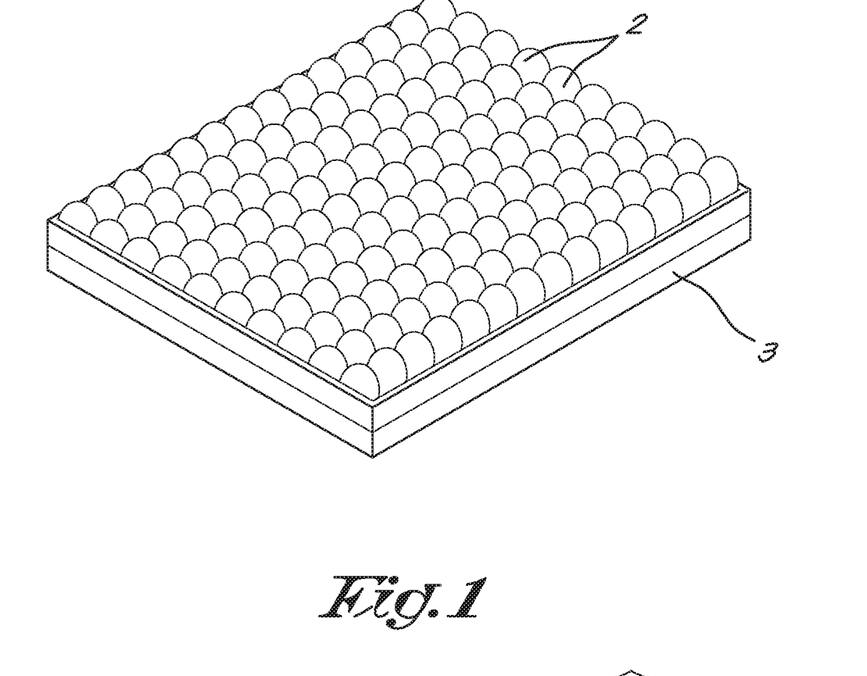
FIG. 1 shows an incubation tray 3 according to the invention.

During approximately the first 18 days, the eggs are usually in incubation trays, as shown in FIG. 1, where an incubation tray 3 is presented with 10×14 eggs 2. Various embodiments of these incubation trays are known in the market.

After the hatching process the incubation tray 3 is transported on a transport system 4. The status per egg is only known after the monitoring station. The rejected eggs/exploders can now be removed.

Figure 2:
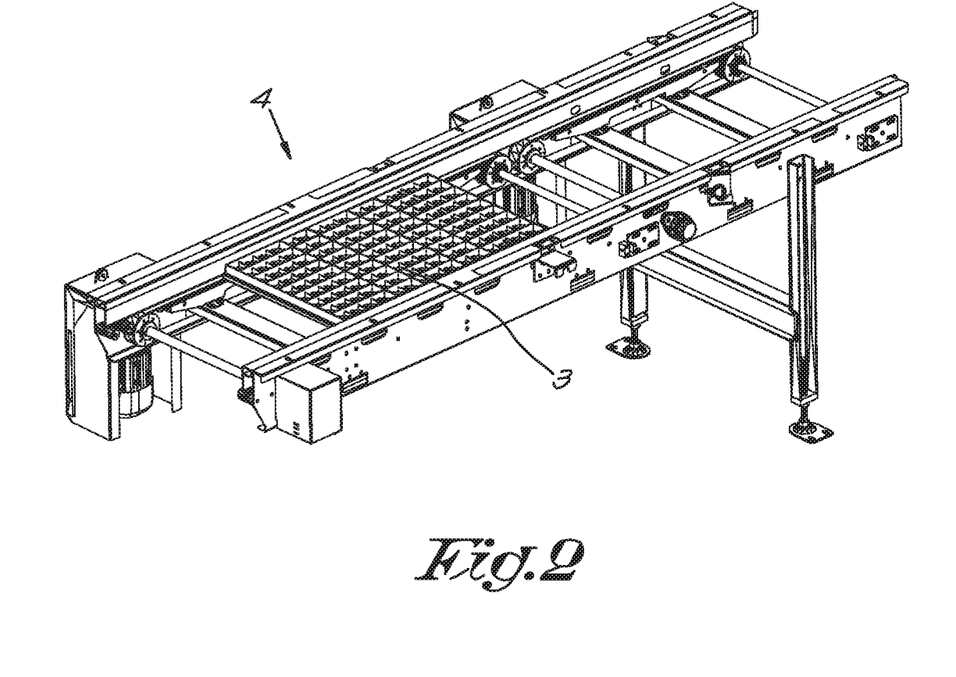
FIG. 2 shows a transport system 4 according to the invention.

FIG. 2 shows a transport system 4 for the transport of one or more incubation trays 3. The incubation tray is transported by means of a narrow belt or chain on the outside (this is not shown in the figure). The position of the incubation tray on the belt is known because the transport system is provided with an encoder (this is not shown on the figure either). The encoder communicates with a controller unit such that the position of the incubation tray is known. The condition is that a certain level of friction is necessary between the transport medium and the incubation tray such that the incubation tray does not shift on the transport medium.

Obviously, it is possible to transport the incubation tray in another way. The example above is only a possible embodiment.

The machine that removes the eggs consists of two parts. The first is a vacuum system and the second is a compressed air system.

Figure 3:
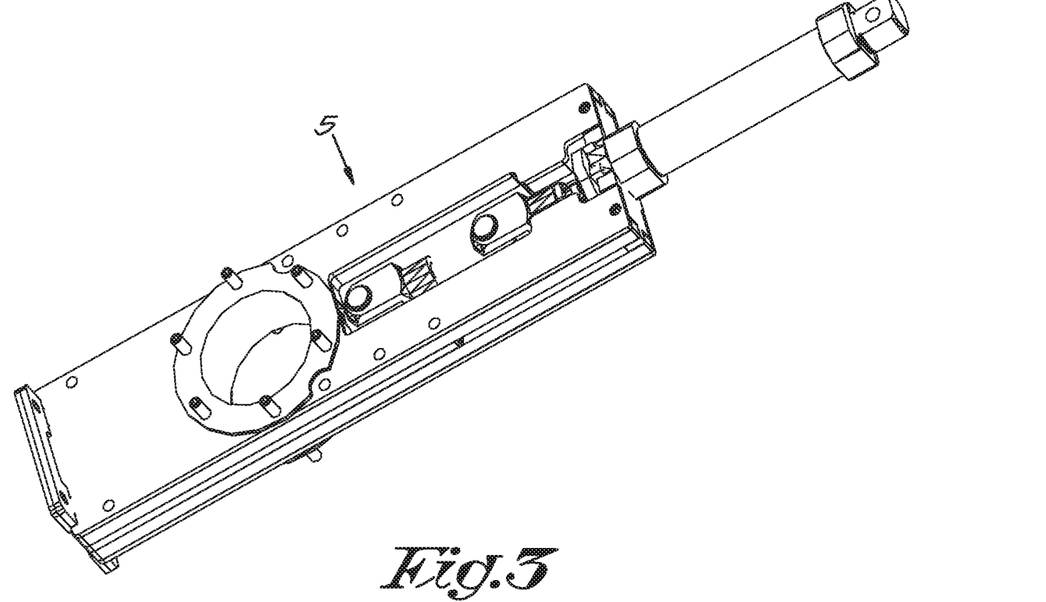
FIG. 3 shows a valve 5 according to the invention.

Immediately above every egg 2, or provided in several rows, a tube 6 is positioned (this is not shown in the figure) with a sealable valve 5, as shown in FIG. 3. This tube is connected with a vessel which is kept at a particular vacuum level by means of, for example, a vacuum pump or a side channel fan.

Figure 4A:
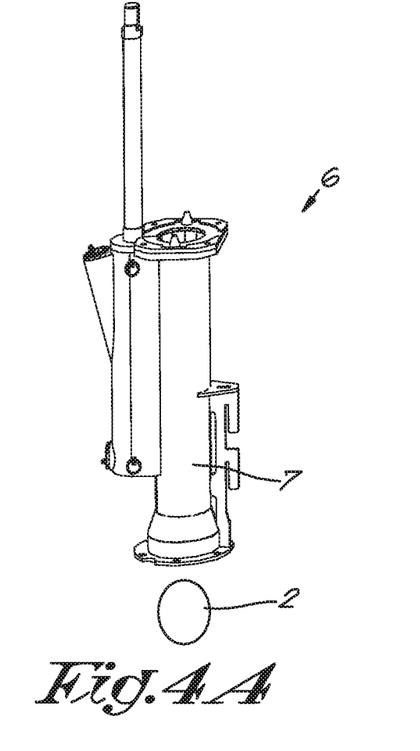
FIG. 4 shows the vertical suction tube 6 above the egg in retracted (4a) and extended 7 (4b) condition.
Figure 4B:
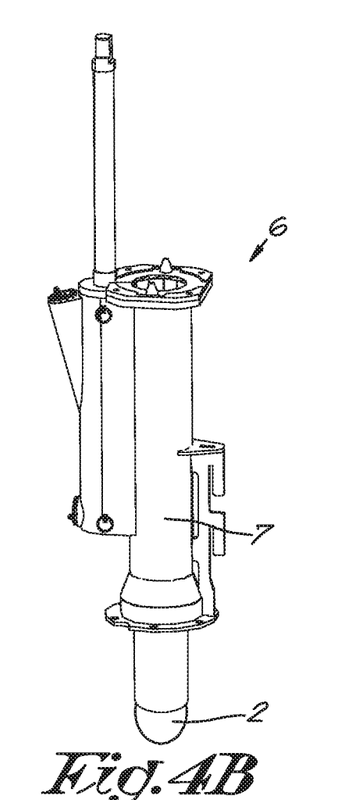

FIG. 4 shows the vertical suction tube 6 above the egg 2 in retracted (FIG. 4A) and extended (FIG. 4B) condition.

Figure 5:
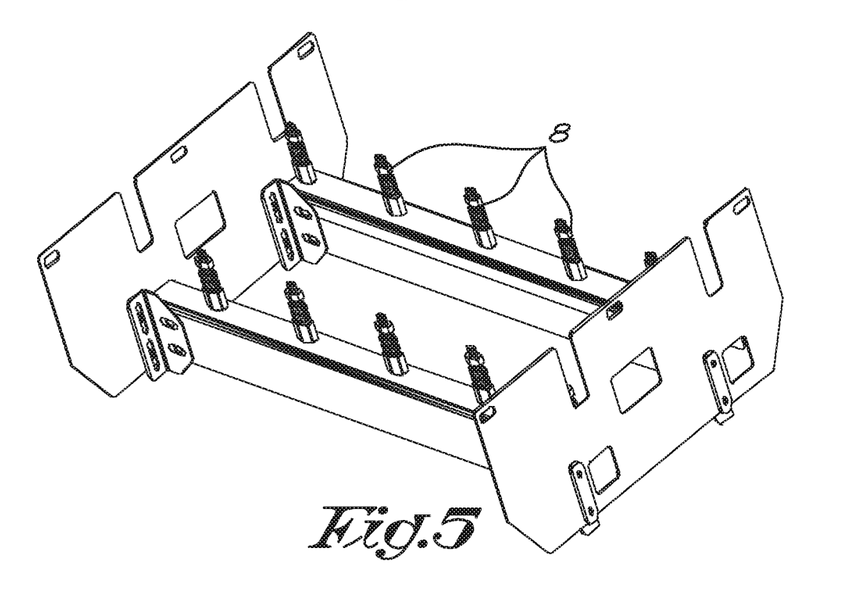
FIG. 5 shows the nozzles 8 from the bottom of the incubation tray 3.

The egg to be removed 2 is positioned under the valve 5 by means of the transport system 4. At a certain moment, the valve 5 is opened such that the egg 2 is sucked up by the suction tube 6. At the same time a certain air flow or overpressure blows against the bottom of the egg 2 from below. FIG. 5 shows the nozzles 8 below the egg 2.

The blowing power 8 and the suction power 6 work together to retrieve the egg 2 that needs to be removed from between the other eggs.

In a practical embodiment the incubation tray has a particular constant speed and the timing of the opening of the valve 5 (when the valve opens or when the suction begins and the duration) and the timing of the blowing (when the blowing begins and the duration) can be set completely independently from each other.

Obviously, it is not necessary that the incubation tray has a particular speed. The system also works when it is at a standstill, but the disadvantage is that it has a negative effect on the capacity of the machine line.

Hatcheries are forced to keep the personnel costs as low as possible, which means the capacity of the machine line is very important. In the present invention it is possible to remove the eggs during the transport from the incubation tray, such that the capacity of the line remains high.

If the required capacity of the machine line does not allow the transport to be reversed in the event of stuck eggs and in this way position the egg which was wrongly not removed under the suction tube again, it is also possible to move the incubation tray to a supplementary machine part.

In this supplementary machine part, the stuck exploders are still removed in the manner described above with the movable suction tube and the movable nozzle. Obviously, this increases the investment costs, but it also raises the capacity of the machine line.

Figure 7:
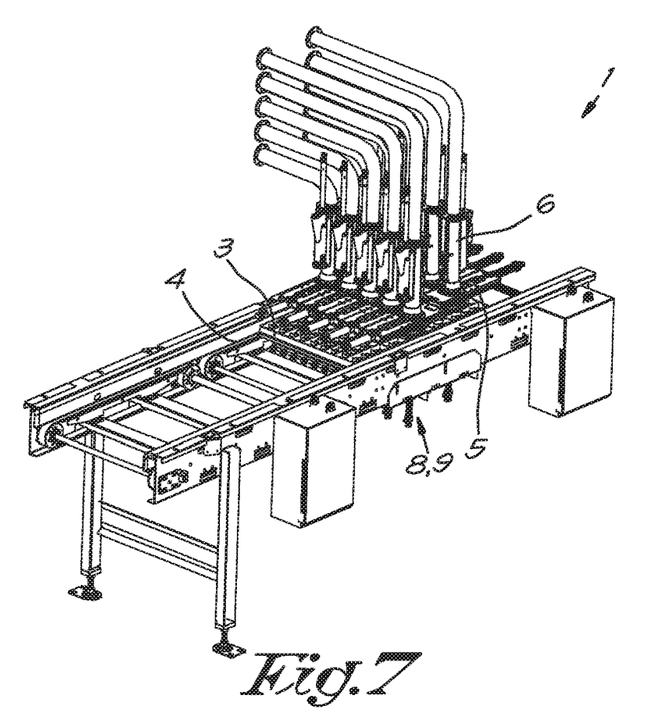
FIG. 7 shows a set-up of a device 1 according to a preferred embodiment of the invention.

FIG. 7 shows a set-up of a device 1 according to a preferred embodiment of the invention. This comprises a transport system 4 to move the incubation trays 3. Above the conveyor of the transport system 4, a subdevice with valves 5 and associated suction tubes 6, which may or may not be vertically movable, is provided. Under the transport system 4 a subdevice is provided with nozzles 8, which may or may not be vertically movable. During the removal of rejected eggs 2, the incubation tray 3 is under and/or above said subdevices.

The operation of the installation 1 is as follows.

In a first station the rejected eggs 2, these are usually exploders, are removed in the manner described above. Subsequently, there is a post-monitoring in a second station for the removal of, for example, stuck rejected eggs that were not effectively removed in the first step. Both stations have a suction tube above the egg and a nozzle under the egg.

When the incubation tray passes, a monitoring medium determines whether the egg that should have been removed, is effectively gone. If the egg is not gone, the incubation tray is stopped and the transport direction reverses. The incubation tray is transported back until the egg is under the suction tube and above the nozzle again. The incubation tray is subsequently stopped.

A vertically movable tube 7 is also incorporated in the suction tube 6. This tube 7 is sent down by means of for example a cylinder, such that the egg 2 is partially or entirely in the tube.

Figure 6:
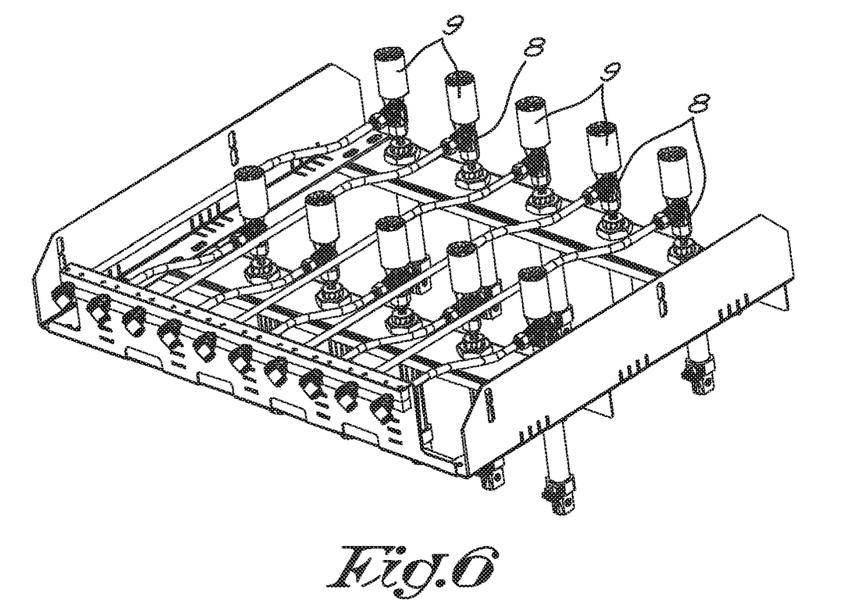
FIG. 6 shows nozzles 8 with a push system 9 with vertical movement according to a preferred embodiment of the invention.

The nozzle 8 and push system 9 below the incubation tray 3 can also move vertically upward, as shown in FIG. 6. In a specific embodiment this nozzle 8 and push system 9 is sent up by means of a pneumatic cylinder.

The stroke/push movement of this vertical movement is such that the egg can be lifted from the bottom.

The nozzle 8 and push system 9 has, in a certain preferred embodiment, more or less the shape of a shell or cup such that the shell of the egg is supported.

The cylinder makes sure that the egg 2 is pressed loose from the incubation tray 3 and that the tube 6, 7 is pressed in.

Should the exploder explode because of this, the tube 6, 7 acts as a shielding for the material flying around. The vacuum in the suction tube 6 makes sure that the egg or the remains of the egg are extracted.

In this way the exploder is always removed and the surroundings are not soiled. The blowing system, when pushing up the egg, can be switched on or off if necessary.

In a practical embodiment it is possible to position the valves in two rows behind each other, above the eggs.

If, for example, an incubation tray is applied whereby 10 eggs are lying next to each other, row 1 may consist of 5 valves next to each other and row 2 also of 5 valves next to each other. In this case the valves in the first row take egg 1, 3, 5, 7, 9 and the valves in row 2 egg 2, 4, 6, 8, 10. This is mainly done because the valves can be broader than the space between the eggs. Obviously, many configurations and embodiments are possible.

A possible embodiment is that in the first station the suction tube 6 and the nozzle 8 cannot move. In the second station the movable suction tube 6, 7 and movable nozzle 8 and push system 9 are present.

In practice only a small percentage of the exploders is stuck. That is why it is also possible to only apply 1 or a number of valves, which by means of a lateral movement can be positioned above the egg that needs to be pushed out. This lateral movement can then take place with an electrical or pneumatic drive or in an alternative way.

The present invention is by no means limited to the embodiments described as an example and shown in the drawings, but a device and method according to the invention as defined by the claims can be realised in all kinds of variants without departing from the scope of the invention.

The invention claimed is:

1. A device (1) for the automatic removal of rejected eggs (2) from an incubation tray (3) whereby the device comprises:
    a suction power (6) above the egg (2) to suck up the egg (2),
    a blowing power provided by an air outlet (8) against the bottom of the egg (2) to blow away the egg (2), whereby the blowing power blows an air flow or overpressure against the bottom of the egg,
    wherein the suction power is provided by a suction tube (6) that is connected to a vacuum source, whereby the suction tube (6) extracts the egg (2) or the remains of the egg into the tube (6) and the blowing power provided by the air outlet (8) blows the egg from the incubation tray into the suction tube (6).

2. The device (1) according to claim 1, wherein the device further comprises a push system (9) to push loose a rejected egg (2) from below out of the incubation tray (3), whereby the egg (2) is lifted from the incubation tray and is pushed further into the suction tube (6).

3. The device (1) according to claim 1, wherein the device (1) comprises a vacuum system and a compressed air system.

4. The device (1) according to claim 1, wherein the blowing power, when pushing up the egg, can be switched on or off.

5. The device (1) according to claim 1, wherein the air outlet comprises a nozzle (8) that blows an air flow or overpressure against the bottom of the egg (2).

6. The device (1) according to claim 1, wherein the suction tube and/or the air outlet is vertically movable.

7. The device (1) according to claim 6, wherein the air outlet (8) is provided with a push system (9) with a vertical movement to push loose a rejected egg (2) that is stuck from the incubation tray (3).

8. The device (1) according to claim 6, wherein the suction tube (6) is provided with a vertically movable tube (7) which is moved down such that the egg (2) is partially or completely in the suction tube (6).

9. The device (1) according to claim 6, wherein the vertical movement of the suction tube (6) and the vertical movement of the air outlet (8) can be set independently from each other.

10. The device (1) according to claim 1, wherein the device comprises plural of the suction tube (6) and plural of the air outlet (8) lined up behind each other in a transport direction.

11. The device (1) according to claim 1, wherein the suction tube is positionable above the egg (2) and the air outlet (8) is positionable under the egg (2) by a lateral movement.

12. The device (1) according to claim 1, wherein the device comprises plural of the suction tube (6) located above the eggs in the incubation tray (3) and plural of the air outlet (8) under the eggs in the incubation tray (3), a number and a position of each of the suction tubes (6) above the eggs in the incubation tray (3) and a number and a position of each of the air outlets (8) under the eggs (2) in the incubation tray (3) correspond with a number of rows and a position of the eggs (2) in the incubation tray (3).

13. The device (1) according to claim 1, wherein the suction power is provided at the same time as the blowing power.

14. The device (1) according to claim 1, wherein the suction power is provided continuously.

15. The device (1) according to claim 1, wherein the suction tubes (6) act as a shielding for any egg material flying around.

16. The device (1) according to claim 1, wherein the device (1) comprises a transport system (4) for the transport of the incubation trays (3).

17. The device (1) according to claim 16, wherein the transport system (4) moves the incubation tray (3) in two directions, back and forth, or stops it moving.

18. The device (1) according to claim 1, wherein the rejected eggs are removed during transport of the incubation tray.

19. The device (1) according to claim 1, wherein the suction tube (7) is provided with a sealable valve (5).

20. A method for automatic removal of one or more rejected eggs (2) from an incubation tray (3) using a device (1) for the automatic removal of the one or more rejected eggs (2) from the incubation tray (3), whereby the device comprises one or more suction tubes (6) connected to a vacuum source and one or more air outlets (8), and a transport system (4) for transport of the incubation tray, the method comprising the following steps:
   a) positioning each of the one or more rejected eggs (2) under a respective one of the one or more suction tubes (6) and above a respective one of the one or more air outlets (8),
   b) sucking up each of the one or more rejected eggs (2) into the respective one suction tube (6),
   c) blowing each of the one or more rejected eggs (2) from the incubation tray into the respective one suction tube (6) using the respective one air outlet (8),
   d) extracting each of the one or more rejected eggs (2) or the remains of each of the one or more rejected eggs through the respective one suction tube (6).

21. The method according to claim 20, whereby steps b) and c) are performed at the same time.

22. The method according to claim 20, whereby the positioning in step a) is performed by laterally moving the one or more suction tubes (6) and the one or more air outlets (8) respectively above and under the one or more rejected eggs to be removed.

23. The method according to claim 20, whereby the positioning in step a) is performed by positioning the incubation tray with the one or more rejected eggs to be removed under the one or more suction tubes or above the one or more air outlets.

24. The method according to claim 20, whereby the steps are repeated until all rejected eggs are removed from the incubation tray.

25. The method according to claim 20, whereby the eggs are removed during transport.

26. The method according to claim 20, whereby multiple eggs are removed at the same time.

27. The method according to claim 20, whereby the incubation tray (3) on the transport system (4) has a constant speed or is not moving during the removal of the egg.

28. The method according to claim 20, whereby in step b) each of the one or more suction tubes (7) is moved down such that each of the one or more rejected eggs (2) is partially or completely in the respective one of the one or more suction tubes (6).

29. The method according to claim 20, whereby in step c) each of the one or more air outlets (8) or a push system is moved upwards, such that each of the one or more rejected eggs (2) is lifted from the incubation tray and is pushed further into one of the one or more suction tubes (6).

30. The method according to claim 29, whereby each of the one or more air outlets (8), when pushing up each of the one or more rejected eggs, can be switched on or off.

31. The method according to claim 20, further comprising determining whether each of the rejected eggs (2) has effectively been removed.

32. The method according to claim 20, whereby the incubation tray (3) is stopped and a transport direction is reversed if the egg (2) has not been removed.

33. The method according to claim 20 for the removal of each of the rejected eggs that are stuck, whereby in step b) moving the suction tube (7) down such that each of the rejected eggs (2) is partially or completely in the respective one of the one or more suction tubes (6), and in step c) moving the respective one or more air outlets (8) or a push system upwards such that each of the rejected eggs (2) is lifted from the incubation tray and is pushed further into the respective one or more suction tubes (6).

34. The method according to claim 33, whereby steps b) and c) are performed at the same time.

35. The method according to claim 20, wherein step b) comprises opening the valve (5) and sucking up the egg via the suction tube (7).

* * * * *